United States Patent

Gilman et al.

[11] Patent Number: 6,072,605
[45] Date of Patent: Jun. 6, 2000

[54] TRANSFORMS FOR DIGITAL IMAGES IN LINEAR FORM

[75] Inventors: Paul B. Gilman, Penfield; Harry D. Franchino; Stephen A. Noble, both of Fairport; John F. Hamilton, Rochester, all of N.Y.

[73] Assignee: Eastman Kodak Company, Rochester, N.Y.

[21] Appl. No.: 08/990,067

[22] Filed: Dec. 12, 1997

[51] Int. Cl.$^7$ .............................. G03F 3/10; H04N 5/225
[52] U.S. Cl. ........................ 358/527; 358/909.1
[58] Field of Search .................... 358/455, 456, 358/453, 447, 448, 458, 504, 527, 531, 534, 538, 296, 909.1

[56] References Cited

U.S. PATENT DOCUMENTS 5,027,196  6/1991  Ono et al. ............................... 358/527
5,528,339  6/1996  Buhr et al. ............................... 355/32
5,694,224  12/1997  Tai ........................................ 358/455

*Primary Examiner*—Kimberly A. Williams
*Attorney, Agent, or Firm*—Raymond L. Owens

[57] ABSTRACT

A method which substantially maintains the exposure latitude contained in one or more digital images captured in linear form and which uses an output device with a predetermined aim curve for producing visual images from such digital image includes the steps of selecting a particular reference portion of the scene corresponding to the digital image and adjusting the code value of such reference portion to a code value corresponding to a desired density and which corresponds to a point on the aim curve and changing the remaining code values of the digital image based upon the selected code value of the point on the aim curve so that a new digital image in linear form is produced; transforming the new digital image to form a third digital image which has code values based on the aim curve; and producing visual images by the output device in response to the transformed third digital image.

9 Claims, 4 Drawing Sheets

TRANSFORMS FOR DIGITAL IMAGES IN LINEAR FORM

CROSS REFERENCE TO RELATED APPLICATIONS

The present invention is related to commonly assigned U.S. Pat No. 5,913,014 filed Jul. 21, 1997, entitled "Transforms for Digital Images" to Gilman et al. The disclosure of this related application is incorporated herein by reference.

FIELD OF THE INVENTION

This invention relates to producing visual images from captured digital images which substantially maintains the exposure latitude of the captured digital image.

BACKGROUND OF THE INVENTION

It is important in producing displays or prints from digital images to fit the dynamic range of the originally captured scene to the dynamic range of the materials available for displaying or printing using the best possible transform. Digital images are usually captured in linear form. A limiting factor is the dynamic range of the materials available for displaying or printing. By selectively choosing the proper transform for displaying or printing, it is possible to display or print esthetically pleasing images on materials that have less dynamic range than the original scene.

As new materials such as thermal print media and receivers and ink jet technologies have become available for displaying or printing, they have introduced larger dynamic range than available with previous technologies. It is well known how to display or print digital images on these types of media. However, it is difficult to design different transforms that best take advantage of these new media. A key element in any new transform is to be able to utilize the full dynamic range of the media for displaying or printing the digital images.

There have been a number of techniques for improving the tone reproduction of digital images, see for example, U.S. Pat. Nos. 4,792,518 and 5,300,381. For a discussion of tone reproduction, see "The Tone Reproduction of Colour Photographic Materials," R. W. G. Hunt, I. T. Pitt, and P. C. Ward, J. Photog. Sci., 17:198(1969).

As set forth in the above disclosures, a number of techniques are disclosed which require that the media be photographic media and the techniques for making the images are very complex. The publication by Hunt et al describes the "ideal system" for printing photographic images to correct for camera flare, printer flare, and viewing flare but offers no practical way to implement this theoretical tone reproduction curve.

U.S. Pat. No. 5,528,339 discloses techniques for improving the tone reproduction of digital images on other media such as thermal, ink jet and electrophotographic. However, the media available for the printing of the digital images far exceeds the dynamic range previously described by having lower minimum densities and considerably higher maximum densities. The same problems exist for soft copy outputs on screens.

Heretofore, the printing of digital images from digital capture sources is accomplished by calibrating the computer monitor used to view the image so that it visually gives a preview of what the print will look like when it is printed so that "what you see is what you get." References which discuss the strategy for printing digital images include The User's Guide for Adobe Photoshop 4.0 (1996); "Preparing Digital Images for Print", by Sybil Ihrig and Emil Ihring, published by McGraw Hill, N.Y. (1996); "Photoshop Artistry", by Barry Haynes and Wendy Crumpler, published by Sybex, San Francisco, Calif. (1995); and "Macworld Photoshop 3 Bible 2nd Edition", by Deke McClelland, published by IDG Books, Foster City, Calif. (1994).

The digital image when displayed in linear form does not look good on the monitor and is difficult to judge for image quality.

The big disadvantage of displaying the digital data in a form optimized for viewing first is that the exposure latitude of picture taking is severely comprised as important detail information for printing is discarded to shape the data for display on the monitor screen.

SUMMARY OF THE INVENTION

It is an object of the present invention to produce output digital images from input digital images captured in linear form which maintain the exposure latitude contained in the captured digital image.

It is another object of the present invention to make full use of the exposure latitude provided in input devices which capture digital images when producing output images.

These objects are achieved by a method which substantially maintains the exposure latitude contained in one or more digital images captured in linear form and which uses an output device with a predetermined aim curve for producing visual images from such digital image, comprising the steps of:

a) selecting a particular reference portion of the scene corresponding to the digital image and adjusting the code value of such reference portion to a code value corresponding to a desired density and which corresponds to a point on the aim curve and changing the remaining code values of the digital image based upon the selected code value of the point on the aim curve so that a new digital image in linear form is produced;

b) transforming the new digital image to form a third digital image which has code values based on the aim curve; and c) producing visual images by the output device in response to the transformed third digital image.

In accordance with the present invention, the digital image is not only optimized for printing, it is also optimized for viewing along with a much greater exposure latitude. The digital image is captured in linear form and, in accordance with the present invention, it is operated upon to produce a second digital image which is also in linear form. The third digital image is no longer in linear form, but is optimized using the appropriate aim curve to substantially maintain the exposure latitude of the captured digital image and produce an aesthetically pleasing visual image.

The present invention optimizes print quality and exposure latitude for digital imaging. The present invention can produce output images which have exposure latitudes often found in using silver halide films.

DETAILED DESCRIPTION OF THE INVENTION

Print media, such as thermal print and ink jet receivers, can produce images with a fairly wide dynamic range. The present invention makes it possible to utilize the full dynamic range of the digital capture device for making output digital images.

Image capture devices, in accordance with the present invention, can include digital cameras and scanners. Images that are captured, for example, on other origination sources (photographic paper, slides, and negatives) can be converted to digital images by scanners. These images are typically captured in linear form. Printers, in accordance with the present invention, can be silver halide printers, thermal printers, ink jet printers, electrophotographic printers, and the like.

The present invention is applicable for printers which produce colored prints on a particular medium. However, it is also applicable for displaying images on a display such as a cathode ray tube (CRT) monitor. Moreover, the present invention is also applicable for making black and white or colored prints. The present invention is also applicable for capturing and displaying images.

Figure 1:
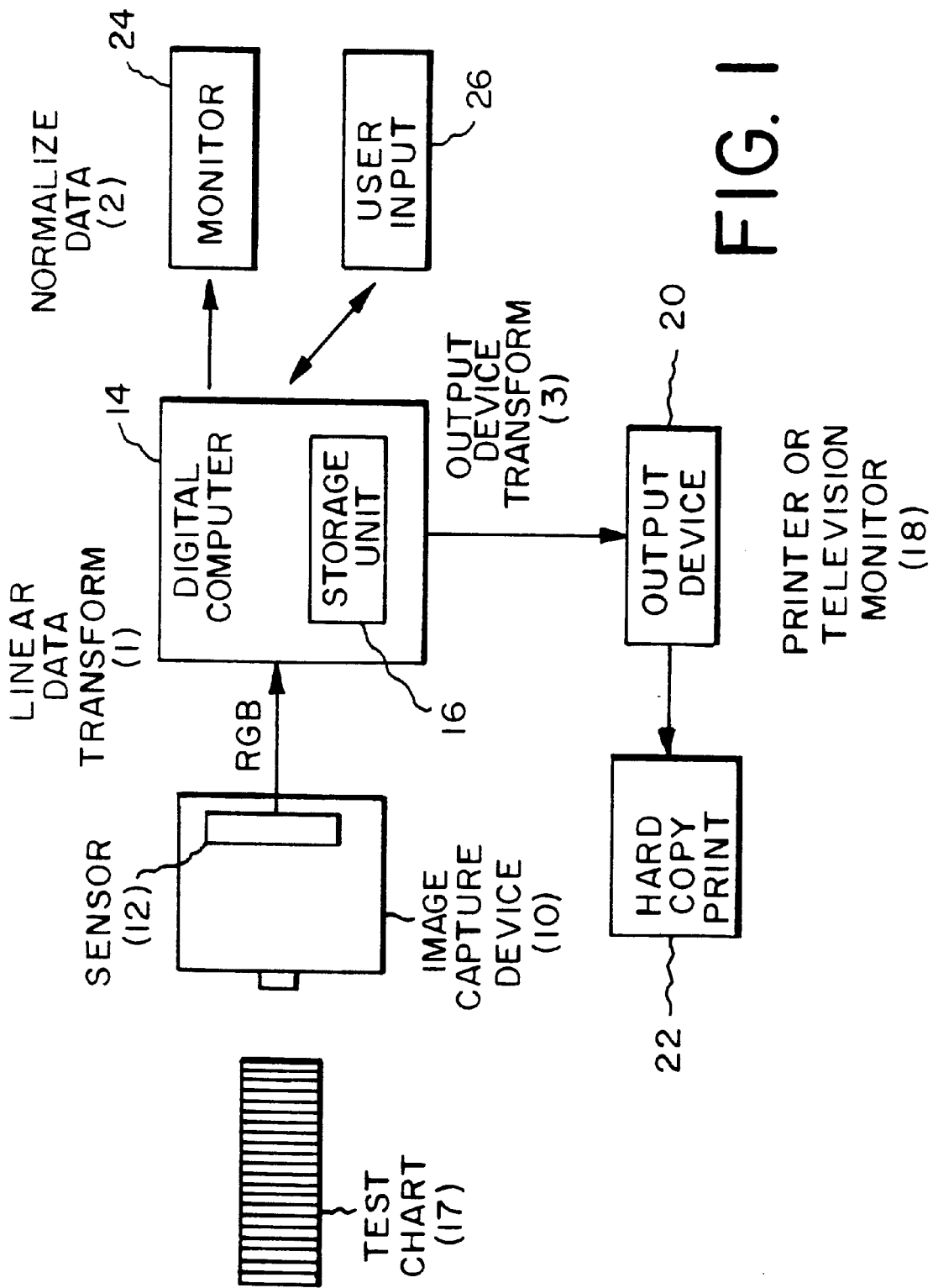
FIG. 1 is a system block diagram showing an image capture device which produces a digital image and the structure for changing such digital image to produce improved exposure latitude and quality images by an output such as a monitor or a hard copy printer.

FIG. 1 is a system block diagram which includes an image capture device 10 which produces a linear digital image. The image capture device 10 may include a still camera with an area image sensor 12. The area image sensor can be an area image sensor which can use transistors or charge coupled devices. In order to initially set up the system, the camera can be shown to take an image of a standardized test target or chart 17. The use of the test chart will be discussed later in the specification. The output of the sensor 12 typically is a series of digitized pixels. When the image is colored, these pixels normally represent the primary colors red, green, or blue; or the substractive colors cyan, magenta, or yellow. In any event, the digital image is applied to a storage unit 16 found within a digital computer 14.

It will be understood that the digital computer 14 and its storage unit 16 includes a microchip which provides the digital computer functions. Another chip can be used to provide the storage unit 16. In any case, the digital computer operates upon the captured digital image found in the storage unit 16. Moreover, the image capture device 10, of course, is not limited to a still camera; but digital video cameras can also be used in accordance with the present invention. Also, transmission (film) or reflection (paper/scanners) can be used as the capture device.

The digital computer 14 changes the captured digital image to produce improved exposure latitude and quality images by an output device such as a printer as will be described hereinafter. Use of the term digital image in linear form will be discussed with reference to FIG. 2. An aim curve, which will be described in reference to FIG. 3, is used in printing the transformed digital image.

A computer readable storage medium can provide the necessary software for operating the computer. Such a medium may include a magnetic disk (such as a floppy disk), magnetic tape, optical storage media such as an optical disk, optical tape, or solid state electronic storage devices such as random access of memory (RAM) or read-only memory (ROM) or any other physical device or medium employed to store a computer program.

The present invention substantially maintains the exposure latitude contained in one or more digital images captured in linear form by the image sensor 12 and stored in the storage unit 16 is converted through processing to an output digital image which uses an output device 20. When the output device is a printer, an output hard copy print 22 is provided with improved digital image. It will be understood that the output device 20 can be an ink jet printer or an electrophotographic printer. Moreover, a silver halide printer can also be used in accordance with the present invention. The digital image in storage unit 16 is displayed on a monitor and a user views the monitor 24 and selects a particular reference portion of the displayed scene corresponding to the captured digital image. The operator then provides an input through a user input such as a keyboard 26 to the digital computer 14 for adjusting the code value of such reference portion to a code value corresponding to a desired density and which corresponds to a point on an aim curve (see FIG. 3) and the digital computer 14 automatically changes the remaining code values of the digital image based upon the selected code value of the point on the aim curve so that a new digital image in linear form is produced. It will be understood to those skilled in the art that this selection process need not be under the control of an operator, but can be performed automatically using sensors and predetermined algorithms tailored to recognize the captured scene.

Figure 3:
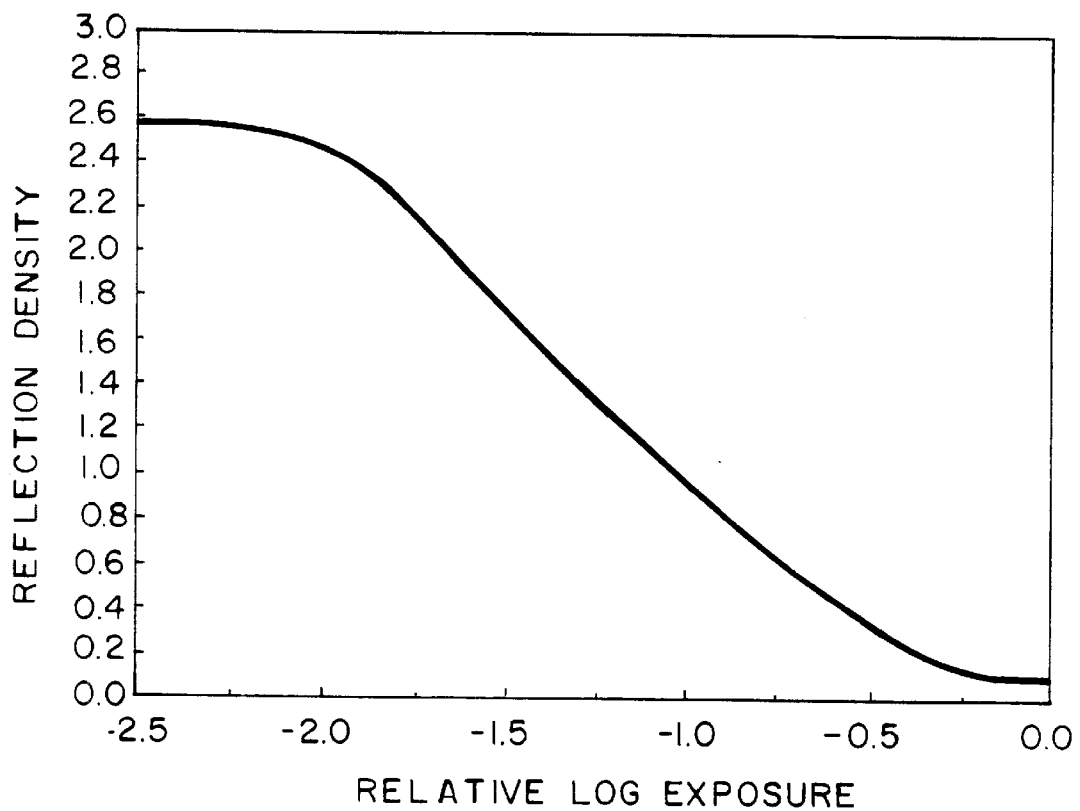
FIG. 3 shows a particular aim curve in reflection density vs. log exposure for an output printer device which can be used in accordance with the present invention.

The next step in the process is for the digital computer 14 to transform the new digital image to form a third digital image which has code values based on the aim curve (FIG. 3). It should be apparent that the new digital image is now, for the first time, nonlinear. The new digital image is now applied to the output device 20. If the output device is a printer it will, of course, produce an optimized a hard copy print.

Figure 2:
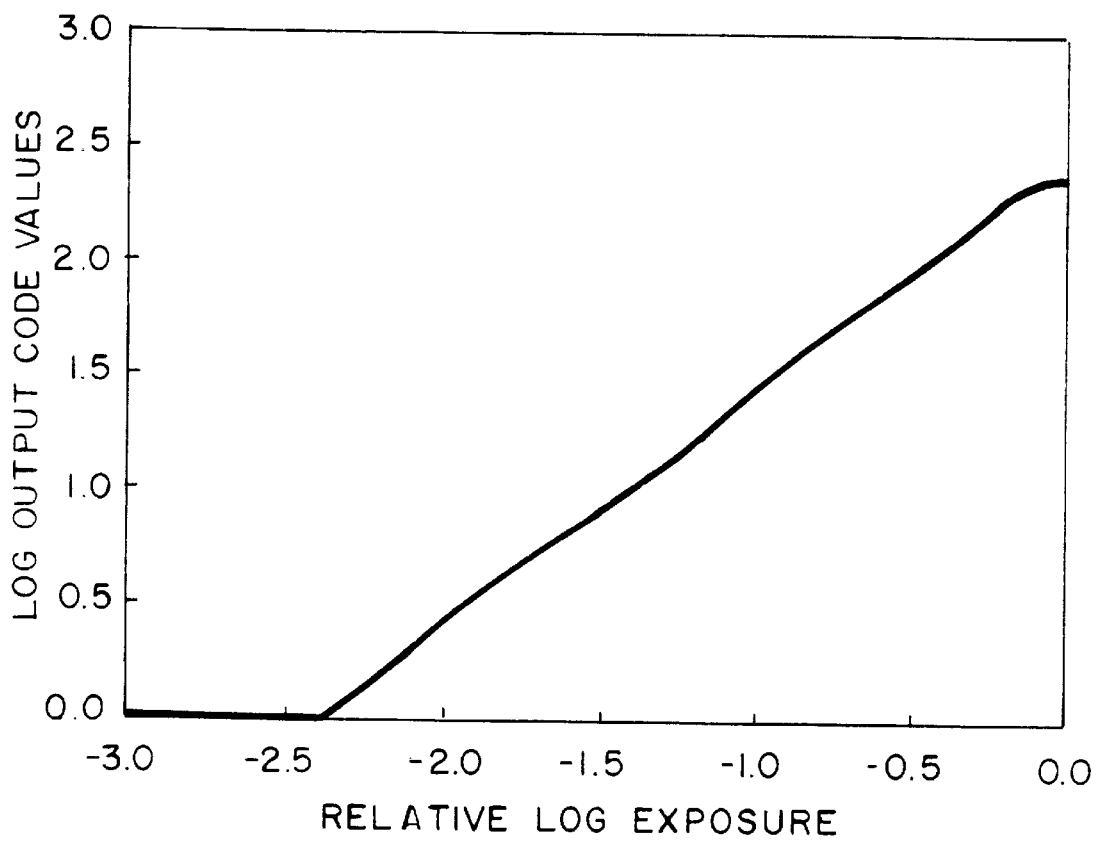
FIG. 2 is a graph which shows a plot of log code values vs. log exposure for the captured digital image in linear form.

Turning now to FIG. 2, is a plot of the log of the output log values vs. the relative log exposure. As shown, this produces a substantially straight line, and that is the reason that the captured digital image in the storage unit 16 is said to be in linear form.

In FIG. 3, there is shown an aim curve which demonstrates the format in reflective density vs. relative log exposure for an optimized output image. For a more complete description of aim curves and construction of printer transforms, see the above referenced commonly assigned U.S. Pat. No. 5,913,014 filed Jul. 21, 1997 to Gilman et al.

Figure 4:
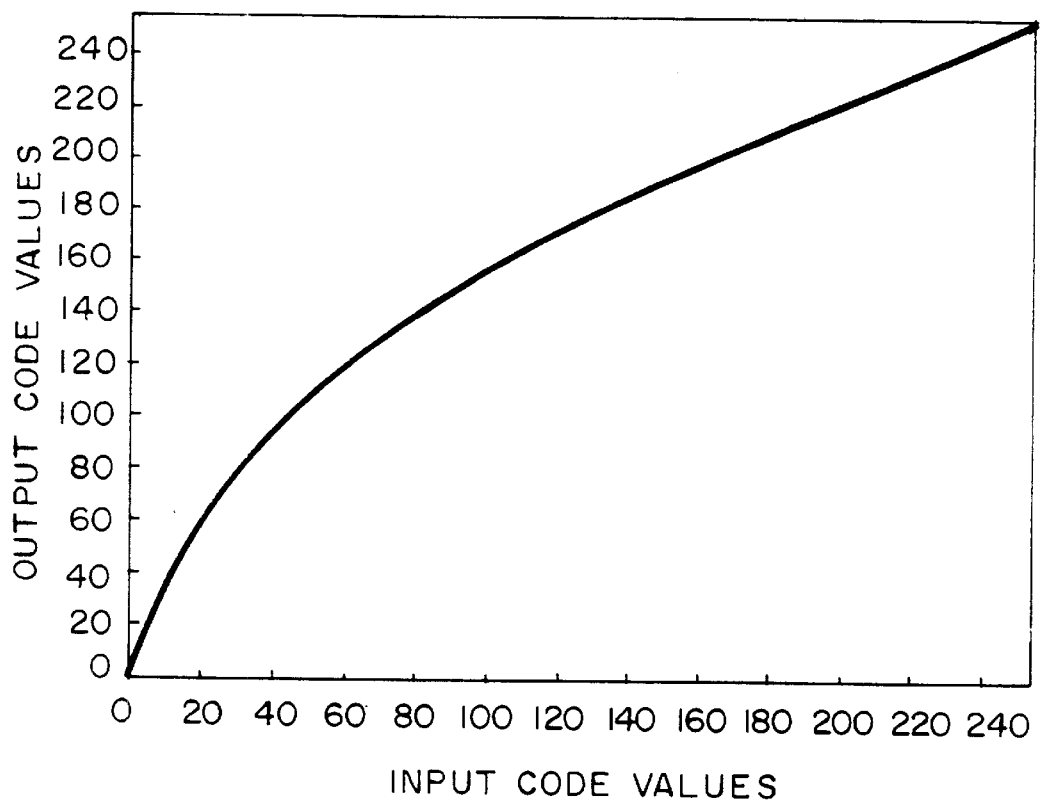
FIG. 4 is a graph which shows the output code values vs. input code values for a transform which is used in accordance with the present invention to produce a third digital image useable by a monitor or an output printer.

FIG. 4 shows a transform for converting the new linear digital image so that it will transform data to produce an optimum image in accordance with the aim curve shown in FIG. 3.

The first step in the process is for the digital camera to take an image of a scene. For the first time it actually takes an image of the test target 17. In the present practice, the camera is actually connected through a port to the computer which includes a program such as Photoshop 4.0. This program accepts the input from the camera with an appropriate driver and actually causes a linear digital image to be temporarily stored, typically in read and write memory. The image is presented onto the screen of the monitor 24 where it is observed by the user who then selects the reference portion. In the following example, the image sensor is capturing red, green, and blue colors. When the test target 17 is the McBeth COLOR CHECKER and the user selects the white patch. The user then selects the white patch. This white patch is adjusted to correspond to RGB code values of 252. A code value of 252, of course, means that a reference portion of the scene is white.

The code value of 252 corresponds to a point on the aim curve and the computer, which can use the Photoshop program, changes the remaining code values of the digital image based upon the selected code value of the point on the aim curve so that a new digital image in linear form is produced;

b) transforming the new digital image to form a third digital image which has code values based on the aim curve In accordance with the present invention, the image processor provides the captured digital image to a display monitor 18 which displays such image. A user selects a particular reference portion of the scene corresponding to the digital image from the monitor 24 and adjusts the code value of such referenced portion (see FIG. 2) to a code value corresponding to a desired density and which corresponds to a point (see FIG. 3) on the aim curve and changes the remaining code values of the digital image based upon the selected code value of the point on the aim curve so that a new digital image in linear form is produced.

The new digital image is transformed to form a third digital image which has code values based on the aim curve. Visual images by the output device 20 as shown on monitor 24 in response to the transformed third digital image.

Example Using Linear Digital Capture

1. Using a Kodak DCS 460 Camera as the image capture device a series of images were taken of a typical professional scene and the exposure was varied over 6 stops. One of the exposure series used studio flash equipment with exposures of $1/125$ th of a second at $f/32$, $f/22$, $f/16$, $f/11$, $f/8.0$, $f/5.6$ and $f/4.5$. The normal exposure for this series was $1/125$ of a second at $f/11$.

2. With reference to FIG. 1, the digital computer was a Macintosh Computer 8100/80 using Adobe Photoshop 3.0, ACQUIRE each of the images using a LINEAR TEST DRIVER.

3. After acquiring each image from the image capture device and storing it in the computer, the computer using the Adobe Photoshop 3.0 software adjusted image levels and selected as the particular reference portion a reference white patch to a code value of 252. This was done by doubly clicking the right hand eyedropper and setting the RGB values to 252, 252, 252, clicking on OK then clicking on the reference white patch.

4. The operation in Step 3 normalizes all of the images to the same reference white. Because the images were opened with a linear driver, this step just moves the digital image data up and down a linear slope with out shaping or distorting the data. This is an advantage over other programs which shape the digital data for immediate display and do not permit a linear shifting of the digital image data. Any shifting of the data of a non linear image results in a severe distortion of the data and undesirable clipping of useful printing data.

5. After the linear scenes are normalized to the reference white of code value 252. This is a selected code value of a point on an aim curve as discussed above. With an image on the computer monitor 24 (this is the second image discussed above) in Adobe Photoshop GO TO IMAGE ADJUST CURVES and LOAD a printer transform as in FIG. 4 which then converts the normalized digital image to a new tone scaled form optimized for digital printing. This corresponds to the third digital image discussed above.

6. When these steps were completed for each image, acceptable hard copy color prints were made on a Kodak XLS 8600 Thermal Printer with the printer table being in the default position, all having the same appearance may be obtained from exposures having 2 stops of over exposure and 3 stops of underexposure.

The invention has been described in detail with particular reference to certain preferred embodiments thereof, but it will be understood that variations and modifications can be effected within the spirit and scope of the invention. For example, although the invention has been described with reference to still images, those skilled in the art will appreciate that the methods according to this invention are equally applicable with moving or motion images captured from digital video recorders.

What is claimed is:

1. A method which substantially maintains the exposure latitude contained in one or more digital images captured in linear form and which uses an output device with a predetermined aim curve for producing visual images from such digital image, comprising the steps of:

a) selecting a particular reference portion of the scene corresponding to the digital image and adjusting the code value of such reference portion to a code value corresponding to a desired density and which corresponds to a point on the aim curve and changing the remaining code values of the digital image based upon the selected code value of the point on the aim curve so that a new digital image in linear form is produced;

b) transforming the new digital image to form a third digital image which has code values based on the aim curve; and c) producing visual images by the output device in response to the transformed third digital image.

2. The method of claim 1 wherein the digital images are captured by a digital camera and the visual images are produced by the output device on a thermal print medium.

3. The method of claim 1 wherein the output device is an ink jet printer.

4. The method of claim 1 wherein the output device is an electrophotographic printer.

5. The method of claim 1 wherein the visual images are produced on a monitor.

6. The method of claim 1 wherein the output device is a silver halide printer.

7. The method of claim 1 wherein the visual images are produced on a monitor.

8. A method which substantially maintains the exposure latitude contained in one or more digital images captured in linear form and which uses an output printer device with a predetermined aim curve for producing visual images from such digital image, comprising the steps of:

a) displaying the digital image and selecting a particular reference portion of the scene corresponding to the digital image and adjusting the code value of such reference portion to a code value corresponding to a desired density and which corresponds to a point on the aim curve and changing the remaining code values of the digital image based upon the selected code value of the point on the aim curve so that a new digital image in linear form is produced;

b) transforming the new digital image to form a third digital image which has code values based on the aim curve; and c) printing a digital image by the output printer device in response to the transformed third digital image.

9. A computer program product comprising a computer readable storage medium, which includes an algorithm which substantially maintains the exposure latitude contained in a captured digital image and which uses a printer with a predetermined aim curve for producing prints from such digital image, the algorithm comprising the steps of:

a) selecting a particular reference portion of the scene corresponding to the digital image and adjusting the code value of such reference portion to a code value corresponding to a desired density and which corresponds to a point on the aim curve and changing the remaining code values of the digital image based upon the selected code value of the point on the aim curve so that a new digital image in linear form is produced;

b) transforming the new digital image to form a third digital image which has code values based on the aim curve; and c) producing visual images by the output device in response to the transformed third digital image.

* * * * *